United States Patent [19]
Kawata

[11] Patent Number: 5,653,845
[45] Date of Patent: Aug. 5, 1997

[54] LIQUID CRYSTAL DISPLAY DEVICE AND METHOD OF CONSTRUCTION

[75] Inventor: Yasushi Kawata, Kanagawa-ken, Japan

[73] Assignee: Kabushiki Kaisha Toshiba, Kawasaki, Japan

[21] Appl. No.: 669,841

[22] Filed: Jun. 26, 1996

Related U.S. Application Data

[63] Continuation of Ser. No. 390,566, Feb. 17, 1995, abandoned.

[30] Foreign Application Priority Data

Feb. 22, 1994 [JP] Japan ............................... 6-022965

[51] Int. Cl.$^6$ ................................................ G02F 1/1337
[52] U.S. Cl. ................................. 156/344; 428/1
[58] Field of Search ........................ 428/1; 359/76, 359/75, 77, 78, 79; 156/344

[56] References Cited

U.S. PATENT DOCUMENTS 5,359,443 10/1994 Toyooka ........................ 428/1

FOREIGN PATENT DOCUMENTS 6-43558  2/1994  Japan.

*Primary Examiner*—Alexander Thomas
*Attorney, Agent, or Firm*—Oblon, Spivak, McClelland, Maier & Neustadt, P.C.

[57] ABSTRACT

A liquid crystal display device and method of construction, includes a first substrate and a second substrate each having a first surface, and a liquid crystal material provided between the first surfaces of the first and second substrates, and steps of forming a controlling film for controlling an alignment of liquid crystal molecules to adhere to the first surface of the first substrate; peeling the controlling film off of the first substrate; positioning the first and the second substrates with the respective first surfaces confronting each other; and providing liquid crystal material between the first and second substrates.

16 Claims, 8 Drawing Sheets

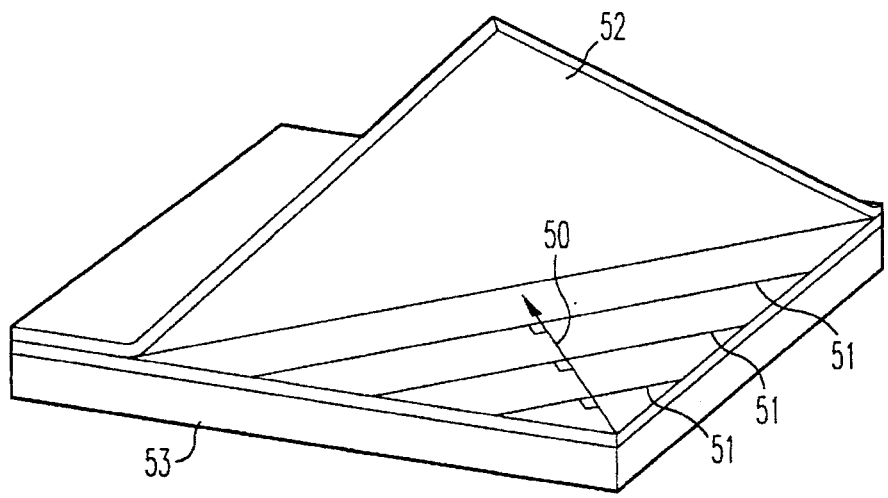
FIG. 5
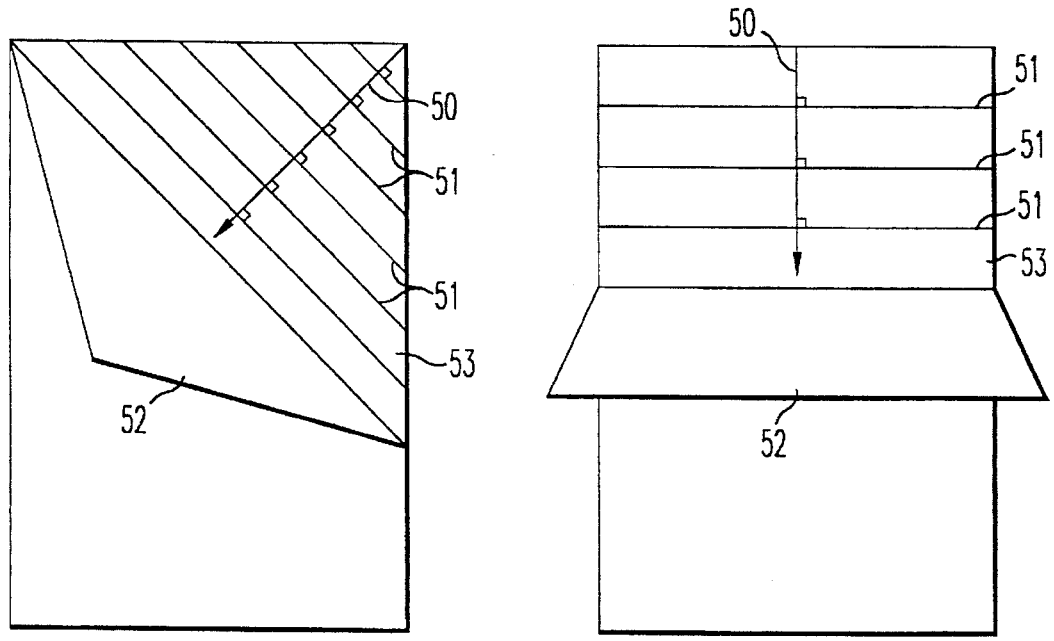
FIG. 6
FIG. 7

LIQUID CRYSTAL DISPLAY DEVICE AND METHOD OF CONSTRUCTION

This application is a Continuation of application Ser. No. 08/390,566, filed on Feb. 17, 1995, now abandoned.

BACKGROUND OF THE INVENTION

1. Field of the Invention

The present invention relates to a method of making a liquid crystal display device and a liquid crystal display device made by the method. More specifically, the invention relates to a new method of providing orientation/alignment of liquid crystal molecules.

2. Description of the Related Art

In recent years, research has been made in an attempt to develop new types of display devices to replace the cathode ray tube (CRT). Among the various new types of display devices, a liquid crystal display device, which is thin and can be operated with small power consumption, is expected to find wide applications in household electric appliances and office automation equipment.

An alignment layer, which is a component of such a liquid crystal display device, is an insulating film whose surface is treated to provide orientation/alignment of liquid crystal molecules. A rubbing treatment, which is one of these alignment treatments, is known conventionally.

A rubbing treatment rubs on the surface of the insulating film with a fiber member like a cotton or a cloth. As a result, the insulating film has an ability to align liquid crystal molecules. The direction of rubbing usually determines the direction of orientation and pretilting up of the liquid crystal molecules (the direction of alignment). The decision of the direction of alignment determines the direction of vision and characteristic of vision of the liquid crystal display device.

The rubbing treatment, however, has difficulty of establishing and controlling conditions and problems of repeatability. Moreover, the rubbing treatment has a problem of dust from the fiber member such as cotton or a cloth, which dust is not suited for clean room required cleanliness.

Japanese Patent Disclosure (KOKAI) No. 6-43458 discloses a method of orientating liquid crystal molecules in order to solve the problem of the dust and the difficulty of rubbing treatment. According to that publication, the method includes forming a direction on a film, and contacting the film on a substrate for printing the direction on the substrate, and taking the film off the substrate. This method does not have the problem of dust and the difficulty of the rubbing treatment because the method does not require the rubbing step.

The present inventor has investigated the method of that publication, and believes the disclosed method has the problem of not inducing pretilting up of liquid crystal molecules. Although a liquid crystal display device ordinarily requires a pretilt angle of 1°~6°, the method has a problem that the method can not induce the pretilt angle. Accordingly, it can not be effectively applied to a liquid crystal display device.

SUMMARY OF THE INVENTION

It is therefore an object of this invention to provide a liquid crystal display device and a method of making the device having a novel uniform alignment film which has an ability of aligning liquid crystal molecules without a step of rubbing treatment such as rubbing on the surface of the alignment film with a cotton or a cloth.

It is another object of this invention to provide a liquid crystal display device and a method of making the device without a dust problem, which is suited to a manufacturing operation in a clean room.

It is still another object of this invention to provide a liquid crystal display device and a method of making the device, which is able to induce a high pretilt angle of liquid crystal molecules suitable for a practical device.

In view of the foregoing objects and others in accordance with the present invention there is provided a method of making a liquid crystal display device, which includes a first substrate and a second substrate each having a first surface, and a liquid crystal material provided between the first surfaces of the first and second substrates, comprising the steps of:

forming a controlling film, for controlling an alignment of liquid crystal molecules, to adhere to the first surface of the first substrate;

peeling the controlling film off of the first substrate;

positioning the first and the second substrates with their respective first surfaces confronting each other; and providing liquid crystal material between the first and second substrates.

Also in accordance with the present invention there is provided a method of making a liquid crystal display device, which includes a first substrate and a second substrate each having a first surface, and a liquid crystal material provided between the first surfaces of the first and second substrates, comprising the steps of:

rolling the first surface of the first substrate with a roller which is covered with a controlling film, for controlling an alignment of liquid crystal molecules, to adhere to and peel from the first surface of the first substrate the controlling film; positioning the first and the second substrates with their respective first surfaces confronting each other; and providing liquid crystal material between the first and second substrates.

Further in accordance with the present invention there is provided a liquid crystal display device comprising:

a first substrate having a first surface conditioned by forming thereon and peeling therefrom a controlling film for controlling an alignment of liquid crystal molecules;

a second substrate having a first surface positioned to confront the first surface of the first substrate; and liquid crystal material provided between the first and second substrates.

Also in accordance with the present invention there is provided a liquid crystal display device comprising:

a first substrate having a first surface conditioned by rolling with a roller which is covered with a controlling film, for controlling an alignment of liquid crystal molecules, to adhere to and peel from the first surface of the first substrate the controlling film;

a second substrate having a first surface positioned to confront the first surface of the first substrate; and liquid crystal material provided between the first and second substrates.

Additionally in accordance with the present invention there is provided a method of making a substrate having a surface for aligning liquid crystal molecules on the surface for use in a liquid crystal display device, comprising the steps of:

rolling the substrate with a roller which is covered with a controlling film, for controlling an alignment of liquid crystal molecules, to adhere and peel from to the surface of the substrate the controlling film.

Also in accordance with the present invention there is provided a substrate for constructing a liquid crystal display device, comprising:

a substrate having a surface conditioned by forming thereon and peeling therefrom a controlling film for controlling an alignment of liquid crystal molecules.

Further in accordance with the present invention there is provided a substrate for constructing a liquid crystal display device, comprising;

a substrate having a surface conditioned by rolling with a roller which is covered with a controlling film, for controlling an alignment of liquid crystal molecules, to adhere to and peel from the surface the controlling film.

The foregoing and other objects, features and advantages of the invention will be apparent from the following more particular description of preferred embodiments of the invention as illustrated in the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiment given below, serve to explain the principles of the invention.

FIG. 5 is a perspective view of a substrate of a liquid crystal display device illustrating aspects of the method of the present invention.

FIG. 6 is a plan view of a substrate of a liquid crystal display device illustrating aspects of the method of the present invention.

FIG. 7 is a plan view of a substrate of a liquid crystal display device illustrating aspects of the method of the present invention.

DETAILED DESCRIPTION OF THE PREFERRED EMBODIMENT

Preferred embodiments of the present invention are described with reference to the accompanying drawings.

Figure 1A:
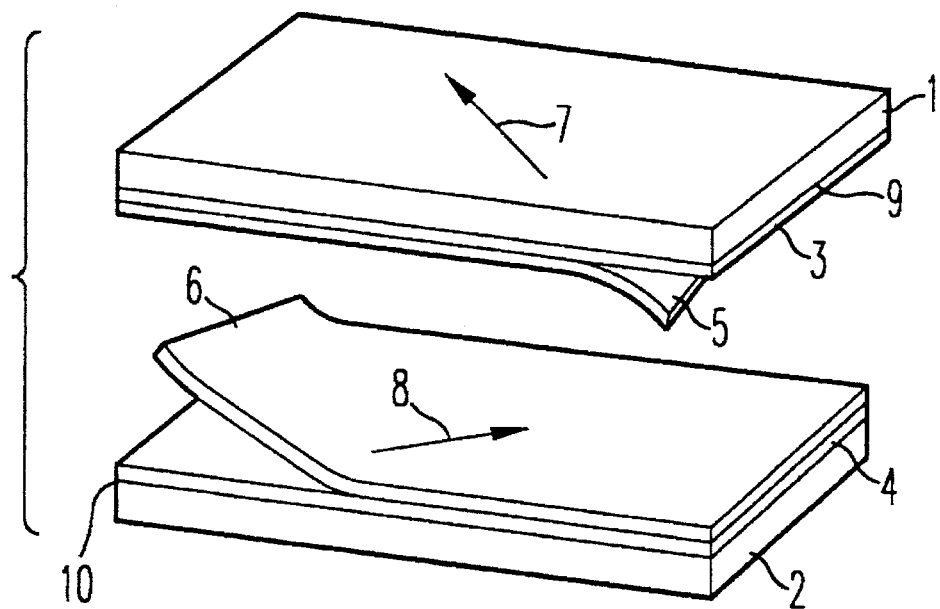
FIGS. 1A, 1B, 1C, and 1D are perspective views of a liquid crystal display device illustrating aspects of the method of the present invention.

In FIG. 1A, alignment films 3, 4 are formed on surfaces 9, 10 of substrates 1, 2 positioned to face each other. Controlling films 5, 6 are formed on the alignment films 3, 4 and each film 5, 6 has a thickness preferably in a range from 10 to 20 μm. The controlling films 5, 6 are peeled off along the peeling directions 7, 8 at a constant speed.

After the alignment treatment, the pair of substrates 1, 2 thus obtained are placed into a 90° twisted nematic liquid crystal display cell by facing the surfaces of the alignment films 3, 4 toward each other. Liquid crystal material is filled into the space between the pair of the substrates 1, 2, thereby forming a liquid crystal display cell.

Figure 1B:
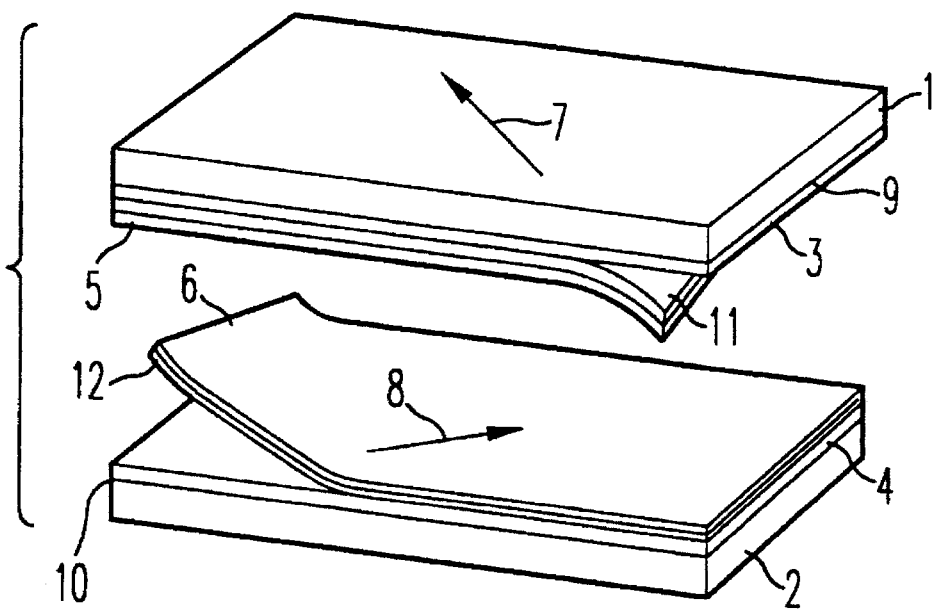

As shown FIG. 1B, it is possible to form surface treatment films 11, 12 as a single molecule layer or plural molecules layers. It is also possible to form the surface treatment film all over the surface or on the surface partially.

This surface treatment film has the ability of adjusting adhesion between the alignment film on the substrate and the controlling film when the controlling film is peeled off of the alignment film on the substrate. Pretilting liquid crystal molecules up is induced by means of the adhesion.

Figure 1C:
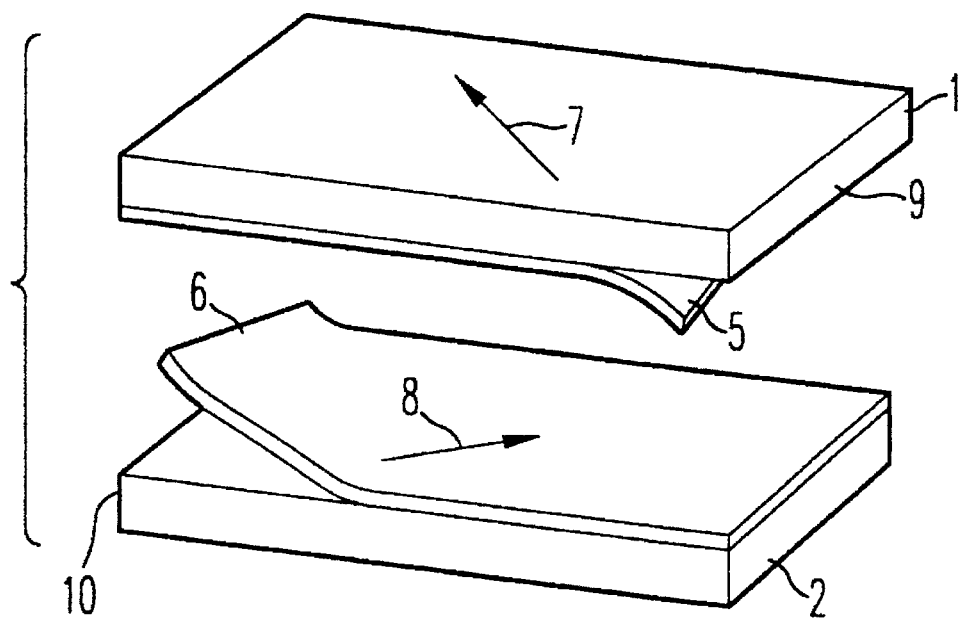

As shown FIG. 1C, it is possible not to form the alignment films 3, 4 and to form the Controlling films 5, 6 on the surfaces 9, 10 directly and then to peel the controlling films 5, 6 off.

Figure 1D:
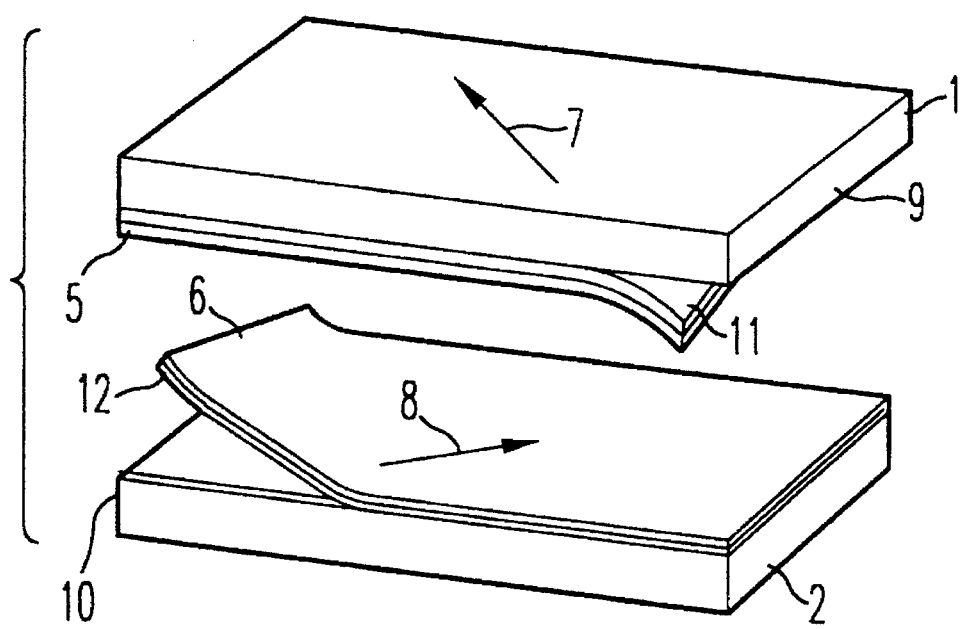

As shown FIG. 1D, it is possible to form the surface treatment films 11, 12 as a single molecule layer or plural molecules layers. It is also possible to form the surface treatment film all over the surface or on the surface partially.

Figure 2A:
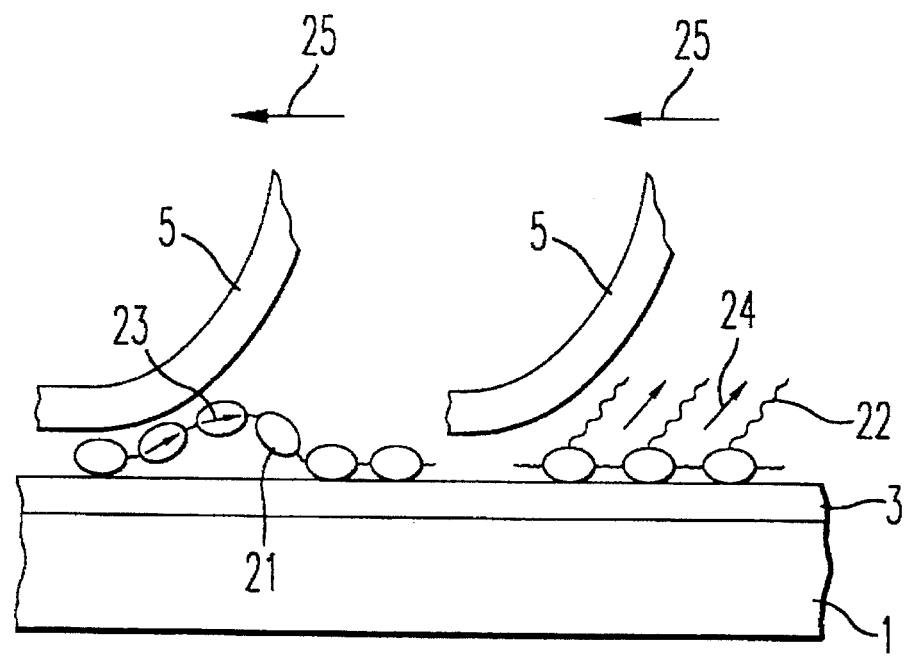
FIGS. 2A and FIG. 2B are cross-sectional views of a substrate of a liquid crystal display device.
Figure 2B:
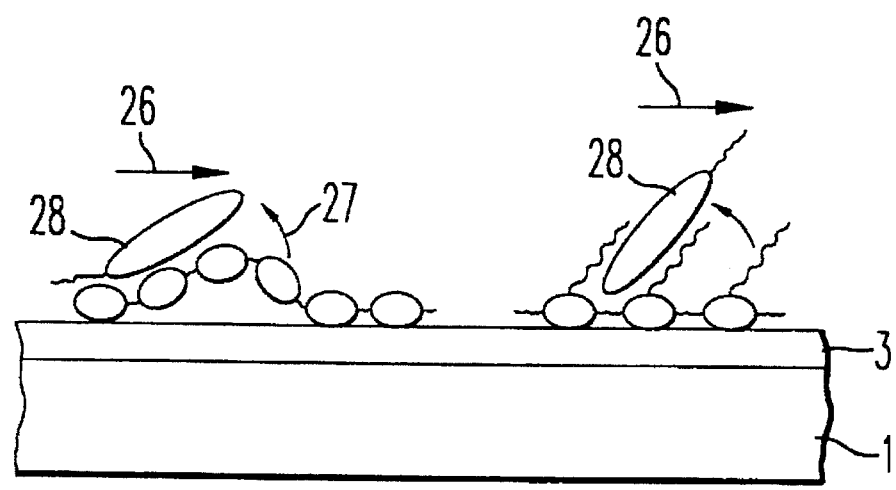

As shown in FIG. 2A and FIG. 2B, organic polymer loop 21 or organic polymer side chain 22 of organic polymer molecules around the surface of the alignment film 3 are stretched out in the directions 23, 24 and it is possible to control the alignment director 26 and the pretilt angle 27, which are necessary for a practical liquid crystal display device, by means of the peeling direction 25 and the peeling speed. Here, a major axis of a liquid crystal molecule 28 is aligned along the peeling direction 25, and the pretilt angle 27 is induced in a direction opposite to the peeling direction 25. The alignment director 26 of a liquid crystal molecule 28 is thereby provided.

Figure 3A:
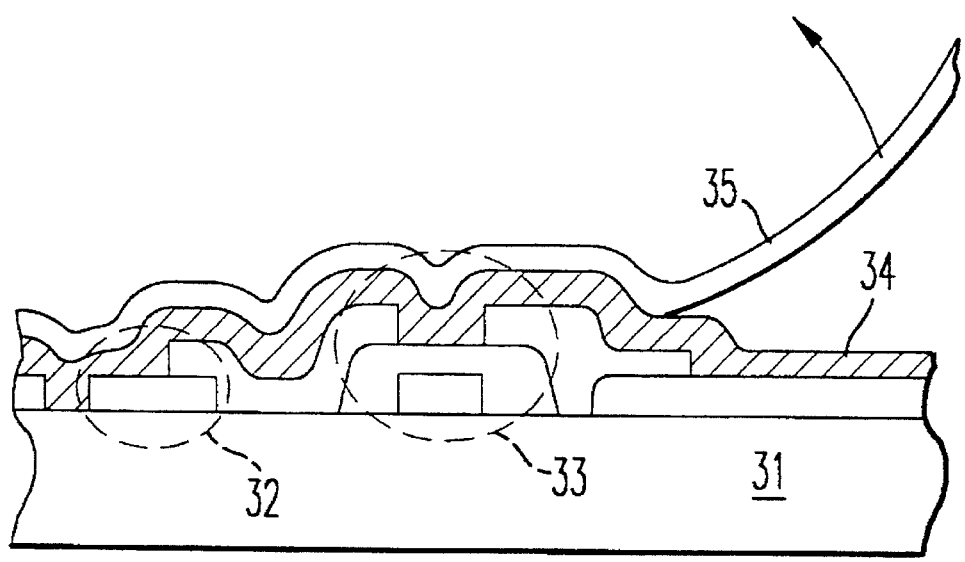
FIGS. 3A and FIG. 3B are cross-sectional views of a substrate having an active switching element and wiring.

In FIG. 3A, a transparent substrate 31 having a wire area 32 and an active switching element area 33, e.g., a TFT, would be difficult to treat with an alignment treatment by means of a rubbing process around the wire area 32 and the active switching element area 33, because of a difference of height between the wire area 32 and the active switching element area 33, e.g., which reaches 1 μm.

A successful, alignment treatment can be provided in accordance with the present invention for any kind of substrate with a structure having such a difference of height and provide an alignment film having uniform alignment ability, because a controlling film 35 is formed on an alignment film 34 so that the controlling film 35 adheres to the alignment film 34. Then the controlling film 35 is peeled off of the alignment film 34.

Figure 3B:
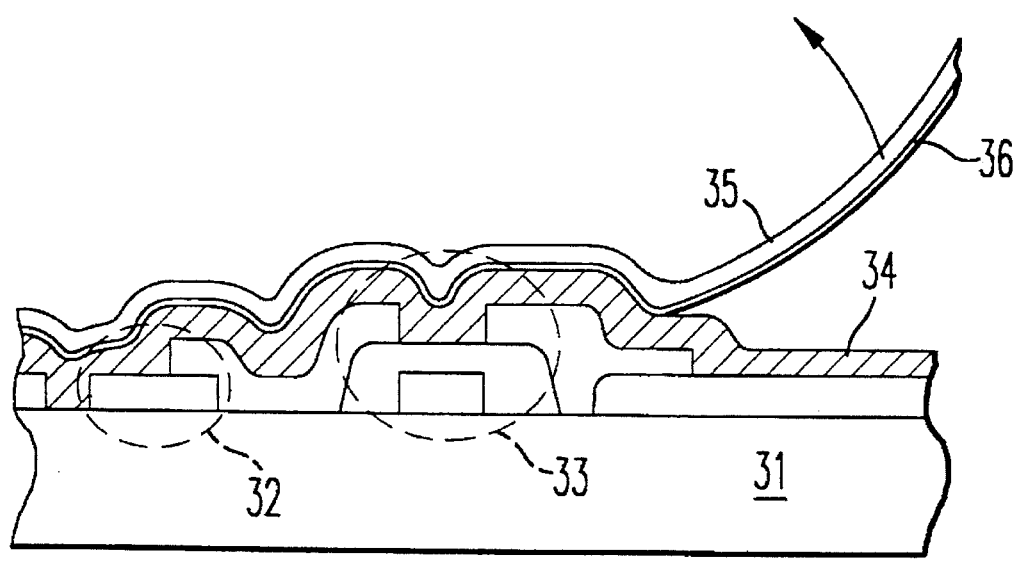

In FIG. 3B, a surface treatment film 36 as a surface treatment is formed on the alignment film 34 before forming the controlling film 35. The structure of the alignment film 34 and the surface treatment film 36 can be formed at the same time by means of aspect separation of a mixture liquid made from two or more materials at the step of applying the mixture on the substrate 31 or by a heat treatment step after the mixture applying step. Polycarbonate can be provided as an alignment film and polystyrene as a controlling film. Polycarbonate:polystyrene=1:200~1:300 in wt % , for example, can be used as the mixture liquid(N-methyl-2-pyrrolidinone). The mixture liquid is applied on the substrate 10~20 μm in thickness, and then the film of that structure is formed by means of heat treatment. Mainly the upper layer is polystyrene film, and the lower layer is polycarbonate film. Thereafter, an alignment treatment is carried out completely by means of peeling the polystyrene controlling film off of the polycarbonate alignment film.

A combination of materials, e.g., polycarbonate and polystyrene, can be used in this step, with the combination of the materials being soluble in the same solvent or near solvent on polarity and the combination causes aspect separation.

Thus far, there has been described the case of a controlling film formed by means of applying and heating. A further feature of the invention overcomes the possible difficulty of peeling the controlling film off at the edge of the substrate.

Figure 8:
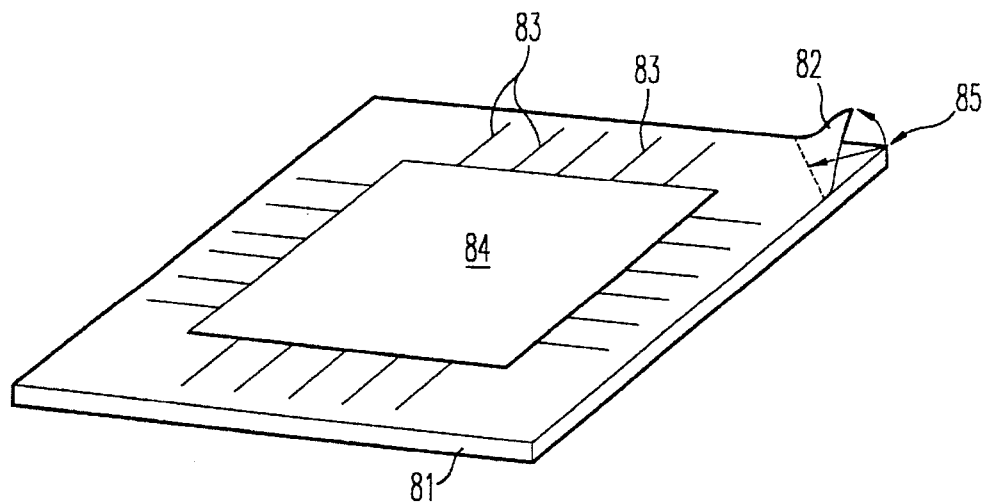
FIG. 8 is a perspective view of a substrate of a liquid crystal display device illustrating aspects of the method of the present invention.

As shown FIG. 8, a substrate 81 having output electrodes 83 may experience difficulty with the peeling step. In FIG. 8, 82 denotes a controlling film, 84 denotes a display area, and 85 denotes the beginning point of peeling the controlling film 84. As shown, there is a potential difficulty of requiring skill to peel at the beginning point 85.

Figure 9:
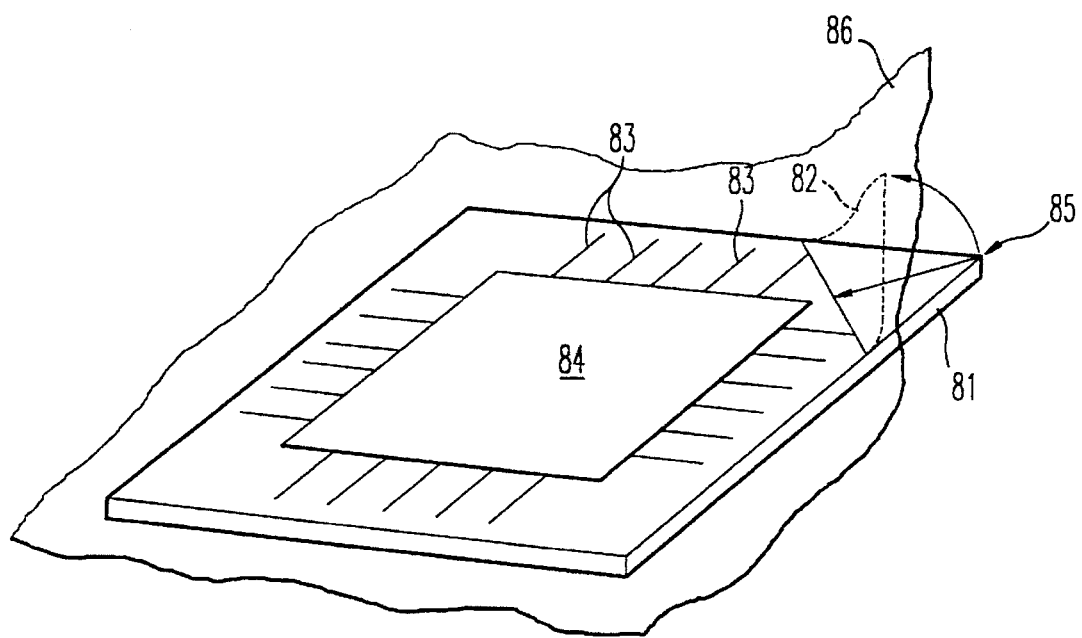
FIG. 9 is a perspective view of a substrate of a liquid crystal display device illustrating aspects of the method of the present invention.

FIG. 9 illustrates a feature for overcoming such difficulties with peeling. In FIG. 9, a sheetlike film 86 larger than the substrate 81 is adhered to the controlling film 82 over the substrate 81 after forming the controlling film 82 on the substrate 81. Then, the controlling film 82 can be easily peeled off of the substrate 81 at the same time of peeling film 86 off of the substrate 81. In this case, it is preferable that the controlling film 82 and the film 86 are the same material, and it is preferable that the film 86 is adhered to the controlling film 82 before the controlling film 82 dries completely. Also, it is preferable that the film 86 is 20~30 μm in thickness because of adhesive.

It is possible that an alignment treatment is carried out completely by means of forming a controlling film on the surface of a substrate not having an alignment film, following which the controlling film is peeled off.

A controlling film made from polyimide and polyamide as a precursor of polyimide is formed 10~20 μm in thickness on a substrate, and then the controlling film is peeled off after heat treatment. Alignment of liquid crystal molecules can thereby be controlled by means of a thin layer, comprising a few molecule layers of polyimide, having an ability of aligning liquid crystal molecules. It is also possible that poly-vinyl-alcohol, poly-vinyl-acetate and so on are used as a controlling film.

Next, there is described a controlling film wound up on a roller.

Figure 4A:
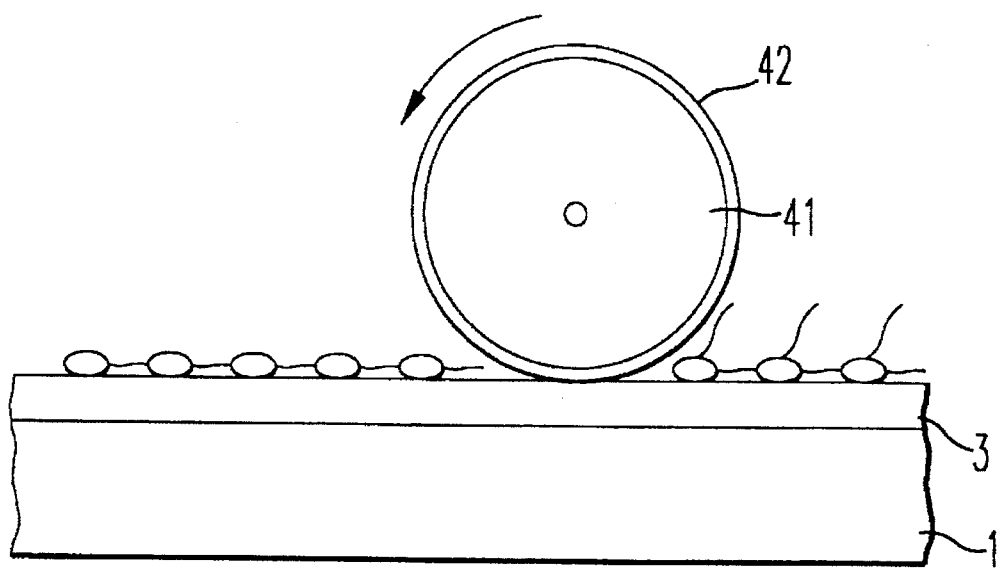
FIGS. 4A, 4B, 4C, and 4D are cross-sectional views of a liquid crystal substrate illustrating aspects of the method of the present invention.

As shown FIG. 4A, a roller 41 is rolled on a substrate 1, and a controlling film 42 wound up on the roller 41 is adhered to an alignment film 3 and immediately is peeled off. As a result, organic polymer loop or organic polymer side chain of an organic polymer molecule around the surface of the alignment film 3 are stretched out. The alignment treatment is, thereby, carried out completely.

Figure 4B:
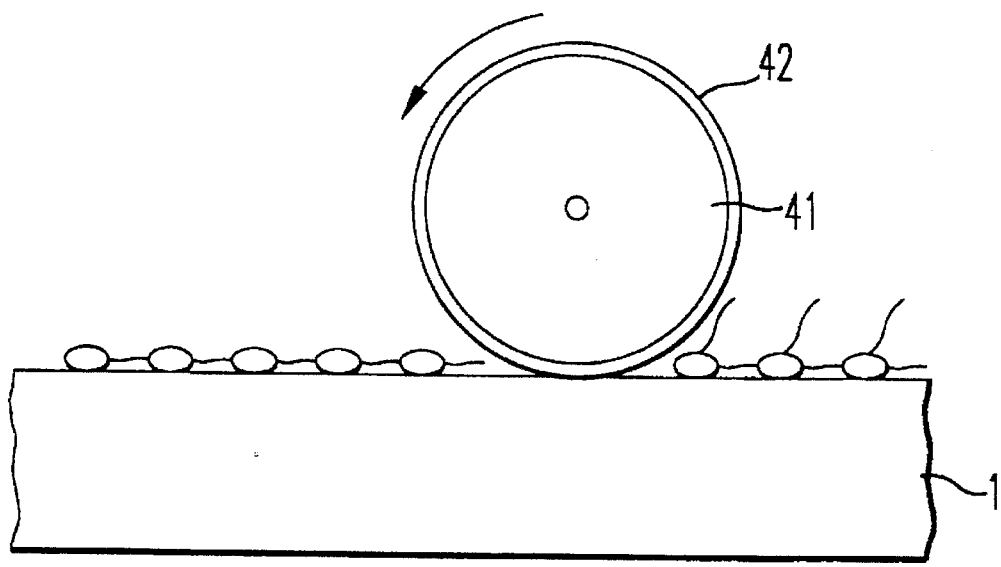

FIG. 4B illustrates the case of FIG. 4A but without the alignment film 3. The roller 41 is rolled on the substrate 1. The controlling film 42 wound up on the roller 41 is adhered to the surface of the substrate 1 and immediately is peeled off. As a result, a single molecule layer on the controlling film 42 is transferred to the surface of the substrate 1, and the single molecule is stretched out. The alignment treatment is, thereby, carried out completely.

Figure 4C:
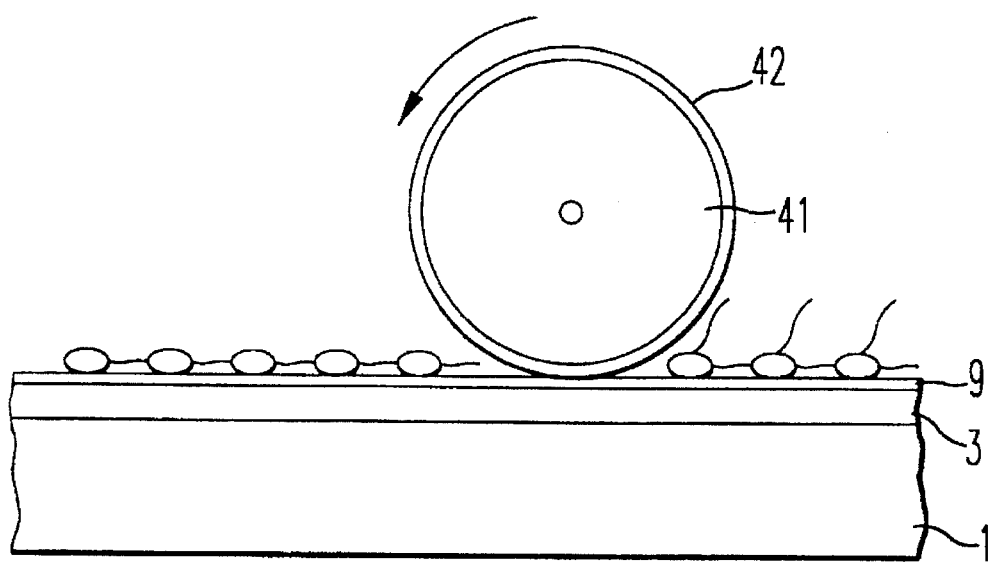
Figure 4D:
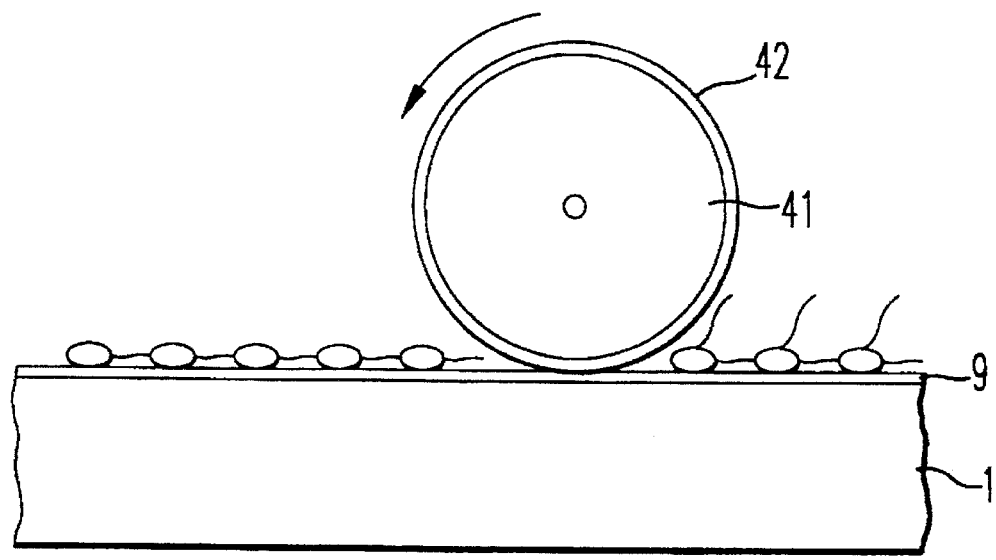

FIG. 4C and FIG. 4D show the cases of each of FIG. 4A, and 4B, respectively, but with insertion of a surface treatment film 9 in order to adjust adhesion between the controlling film 42 and the substrate 1.

Thus, an adhesion between a controlling film and a substrate provide an ability of inducing alignment of liquid crystal molecules when a controlling film is peeled off of a substrate. This alignment ability provides orientation and pretilting up of liquid crystal molecules.

In FIGS. 5, 6, and 7, a controlling film 52 is peeled off in a constant direction such as arrow 50. As a result, the peeled boundary line of the film 52 and substrate 53 is indicated as a contour line 51. Liquid crystal molecules can thereby be aligned in a constant direction.

In accordance with an aspect of the present invention, the surface of a first substrate is treated to control the pretilt angle of liquid crystal molecules to the surface of the first substrate by controlling adhesion before forming a controlling film.

The first substrate preferably has an alignment film on the surface beforehand. The first substrate having the alignment film is more preferable for controlling and maintaining of orientation and pretiling up of liquid crystal molecules than one not having the alignment film.

The step of placing the first substrate in opposition to the second substrate so as to oppose the peeled surface of the first substrate to the second substrate and the step of providing liquid crystal material on the first substrate is interchangeable in order. It is possible to place the first substrate opposed to the second substrate, after providing liquid crystal material between the substrates under vacuum. It is also possible to provide liquid crystal material on the first substrate by dropping the liquid crystal material, followed by placing the first substrate opposed to the second substrate.

It is possible that not only the first substrate receives the orientation treatment, but also the second substrate receives the treatment. It is preferable to treat both substrates.

It is possible that the controlling film is organic polymer made from poly-vinyl-alcohol, poly-vinyl-acetate, derivative of polystyrene, polyethylene, polycarbonate, etc., and a precursor of polyimide such as polyamicacid.

It is possible to control the direction and the pretilt angle of liquid crystal molecules by means of conditions such as the speed and the direction of peeling the controlling film. For example, in the case of the controlling film being sheetlike, the sheet is adhered to the surface of the substrate, following which the sheet is peeled off of the substrate. Then the substrate has the ability of orientating and pretilting up liquid crystal molecules by means of the adhesion between the substrate and the sheet, and it is possible to control the pretilt angle by means of the speed and the direction of peeling the sheet off. Thus, it is possible to control the orientation direction and pretilting up of liquid crystal molecules by means of controlling the adhesion, the peeling speed and the peeling direction.

In the case of the first substrate having an alignment film on the surface beforehand, a material of the alignment film can be chosen from polyimide, precursor of polyimide, polypyrrole, and polyaniline, and it is preferable combination of poly-vinyl-alcohol or poly-vinyl-acetate as a controlling film and a polyimide film or a polyimide film and a precursor of polyimide as an alignment film.

The surface treatment can be carried out before forming the controlling film on the surface, with organosilicon compound, for example
N-(β-aminoethyl-γ-aminopropyltrimetoxysilane), γ-(glycidoxypropylmethyldimetoxysilane), octadecylethoxysilane and the like.

It is theoretically possible to use any materials for the surface treatment which can adjust the adhesion between the surface and the controlling film.

The surface treatment can be carried out by means of applying a material such as one of the above described materials on the surface and forming a very thin film, e.g., a single molecule layer. The invention can be carried out by means of forming the controlling film on the surface treatment film formed on the surface of the substrate, followed by peeling the controlling film off. The surface treatment film formed on the alignment film is preferable a single molecule layer. A ratio of active agent between the alignment film and the controlling film can be adjusted to control the adhesion between the alignment film and the controlling film. Consequently, a pretilt angle of the liquid crystal molecules can be predetermined.

The present inventor also discovered a tendency that as the adhesion is greater, the pretilt angle is larger, as the adhesion is less, the pretilt angle is smaller. A suitable pretilt angle can be obtained for a substantial liquid crystal display device in the case of adhesion satisfying the following inequalities.

$$K1 > K2, F2 > F1 \quad (1)$$

$$K2 > K1, F2 \geq F1 \quad (2)$$

K1 denotes adhesion between the substrate and the alignment film, and K2 adhesion between the alignment film and the controlling film. F1 denotes yield stress of the alignment film, and F2 denotes yield stress of the controlling film. A larger pretilt angle of the alignment film can be obtained under the inequality (1). A smaller pretilt angle of the alignment film can be obtained under the inequality (2).

In accordance with the present invention, a method of forming the alignment film and the controlling film includes applying a material of alignment film on the substrate, followed by forming the alignment film by means of heat treatment, then applying a material of the controlling film on the alignment film, followed by forming the controlling film by means of heat treatment. In this case, it is preferable that the materials of the alignment film and the controlling film are incompatible with each other. Although in the case of using polyimide as the alignment film material, for example, N-methyl-2-pyrrolidinone, N,N-dimethylformamide, γ-butyrolactone and the like is usually used as a solvent, it is preferable to use water-soluble polymer, e.g., poly-vinyl-alcohol, poly-vinyl-acetate and the like as the controlling film material in this case, because it is necessary to prevent a polyimide film from dissolving.

It is possible, however, for there to be some compatibility of the alignment film material and the controlling film material at the interface between the two films according to alignment condition. It is possible to use a pair of materials which have a polymer chain elongation effect by application of shear stress to each other, for example using polyimide as the alignment film material and using polycarbonate or polyethylene as the controlling film material.

Alignment of liquid crystal molecules can be further improved by means of using for the controlling film materials having a molecular weight smaller than that of polyimide in the case of using polyimide as the alignment film material, because it can increase the adhesion between the two films, accordingly the controlling film material easily permeates into the polyimide side chain.

It is possible to form an adhesive precursor of polyimide on a controlling film, which precursor is made from polyimide, following which the controlling film on the surface of the substrate is adhered, and then the controlling film is peeled off of the surface after heat treatment, accordingly a polyimide film remains on the surface.

(EXAMPLE 1)

With reference to FIG. 1A, each transparent substrate is provided in advance with a transparent electrode (not shown). The polyimide alignment films 3, 4 are formed 30~70 nm in thickness on the surfaces 9, 10 of opposite substrates 1, 2 and are subjected to heat treatment at 180° C., for 1 hour. Then, a PVA(poly-vinyl-alcohol) aqueous solution is applied on the polyimide film to a thickness of 10~30 μm. Then the controlling films 5, 6 are formed on and adhere to the alignment films 3, 4, by drying at 70° C., for 2 hours to dry the PVA aqueous solution. Next, the controlling films 5, 6 including a part of the alignment films 3, 4 are peeled off of the substrates 1, 2 along the peeling direction 7, 8 at constant speed of 10 cm/sec. As a result, the alignment film is obtained which has an ability to orient and pretilt up the liquid crystal molecules by means of polyimide organic polymer loop or organic polymer side chain around the surface.

After the alignment treatment, the pair of the substrates 1, 2 thus obtained are placed into a 90° TN by facing the surfaces 10, 11 thereof to each other, and then liquid crystal material (ZLI-3276-100:MERCK obtained 0.1 wt % chiral dopant) is filled into the space between the pair of the substrates 1, 2. A liquid crystal display device in accordance with the present invention thereby is obtained.

(EXAMPLE 2)

With reference to FIG. 1A, each transparent substrate is provided in advance with a transparent electrode(not shown). The polyimide alignment films 3, 4 are formed 70~100 nm in thickness on the surfaces 9, 10 of opposite substrates 1, 2 and are subjected to heat treatment at 180° C., for 1 hour. Then, a PVA(poly-vinyl-alcohol) aqueous solution is applied on the polyimide film to a thickness of 20~40 μm. Then the controlling films 5, 6 are formed on and adhere to the alignment films 3, 4 by drying at 70° C., for 2 hours to dry the PVA aqueous solution. Next, the controlling films 5, 6 including just the surface of the alignment films 3, 4 are peeled off of the substrates 1, 2 along the peeling direction 7, 8 at a constant speed of 2 cm/sec. As a result, the alignment film is obtained which has an ability to orient and pretilt up the liquid crystal molecules by means of polyimide organic polymer loop or organic polymer side chain around the surface.

After the alignment treatment, the pair of the substrates 1, 2 thus obtained are placed into a 90° TN by facing the surfaces 10, 11 thereof to each other, and then liquid crystal material (ZLI-3276-100:MERCK obtained 0.1 wt % chiral dopant) is filled into the space between the pair of the substrates 1, 2. A liquid crystal display device in accordance with the present invention thereby is obtained.

(EXAMPLE 3)

With reference to FIG. 4A, each transparent substrate is provided in advance with a transparent electrode (not shown). The polyimide alignment films 3 are formed 70~100 nm in thickness on the surface of substrate 1 and are subjected to heat treatment at 180° C., for 1 hour. Then, a roller on which a sheetlike film made from PVA(poly-vinyl-alcohol) is wound to 5 mm in thickness is readied, and the alignment film 3 is rolled with the roller in a constant direction at a constant speed. The controlling film 42 wound up on the roller 41 is adhered to the alignment film 3 and immediately is peeled off, so that organic polymer loop or organic polymer side chain of organic polymer molecule around the surface of the alignment film 3 are stretched out. The alignment treatment is, thereby, carried out completely. The roller rolls on the substrate 3~5 times in this example.

After the alignment treatment, the pair of the substrates 1, 2 thus obtained are placed into a 90° TN by facing the surfaces 10, 11 thereof to each other, and then liquid crystal material(ZLI-3276-100:MERCK obtained 0.1 wt % chiral dopant) is filled into the space between the pair of the substrates 1, 2. A liquid crystal display device in accordance with the present invention thereby is obtained.

(EXAMPLE 4)

With reference to FIG. 1C, each transparent substrate is provided in advance with a transparent electrode(not shown). A PVA(poly-vinyl-alcohol) aqueous solution is applied on surfaces 9, 10 of substrates 1, 2 to a thickness of 10~30 μm, and then the controlling films 5, 6 are formed on and adhere to the alignment films 3, 4 by means of drying the PVA aqueous solution at 70° C. 1 hour. Next, the controlling films 5, 6 are peeled off of the substrates 1, 2 along the peeling direction 7, 8 at a constant speed of 2 cm/sec. As a result, the alignment substrates are obtained, with surfaces having an ability to orient and pretilt up liquid crystal molecules by means of polyimide organic polymer loop or organic polymer side chain around the surface.

After the alignment treatment, the pair of the substrates 1, 2 thus obtained are placed into a 90° TN by facing the surfaces 10, 11 thereof to each other, and then liquid crystal material(ZLI-3276-100:MERCK obtained 0.1 wt % chiral dopant) is filled into the space between the pair of the substrates 1, 2. A liquid crystal display device in accordance with the present invention thereby is obtained.

(EXAMPLE 5)

With reference to FIG. 1B, each transparent substrate is provided in advance with a transparent electrode (not shown). The polyimide alignment films 3, 4 are formed to a thickness of 30~70 nm on the surfaces 9, 10 of opposite substrates 1, 2 and are subjected to heat treatment at 180° C. for 1 hour.

Then, the following step is provided as a surface treatment.

The substrates 1, 2 with alignment films 3, 4 thereon are dipped into an ethanol solution of silane coupling dopant (TSL-8345:Toshiba Silicon co.) as a surface treatment dopant. The surface treatment films 11, 12 are, then, formed by means of heat treatment at 180° C. for 2 hours in order to dry and bond at the surface. A controlling film will be formed after a surface treatment.

A PVA(poly-vinyl-alcohol) aqueous solution is applied on the surface treated alignment films 3, 4 to a thickness of 10~30 μm, and then the controlling films 5, 6 are formed on and adhere to the alignment films 3, 4 through the surface treatment films 11, 12 by means of drying the PVA aqueous solution at 70° C. for 2 minutes. The controlling films 5, 6 are, then, peeled off of the substrates 1, 2 along the peeling direction 7, 8 at a constant speed of 10 cm/sec. As a result, the alignment film is obtained having an ability to orient and pretilt up liquid crystal molecules by means of polyimide organic polymer loop or organic polymer side chain around the surface.

The adhesion between the substrate and the alignment film, the adhesion between the alignment film and the controlling film, the yield stress of the alignment film, and the yield stress of the controlling film are according to the inequality (1).

After the alignment treatment, the pair of the substrates 1, 2 thus obtained are placed into a 90° TN by facing the surfaces of the alignment films 3, 4 to each other, and then liquid crystal material(ZLI-3276-100:MERCK obtained 0.1 wt % chiral dopant) is filled into the space between the pair of the substrates 1, 2. A liquid crystal display device in accordance with the present invention thereby is obtained.

(EXAMPLE 6)

With reference to FIG. 1B, each transparent substrate is provided in advance with a transparent electrode(not shown). The polyimide alignment films 3, 4 are formed to a thickness of 70~100 nm on the surfaces 9, 10 of opposite substrates 1, 2 and are subjected to heat treatment at 180° C. for 1 hour.

Then, the following step is provided as a surface treatment.

The substrates 1, 2 with alignment films 3, 4 thereon are dipped into an ethanol solution of silane coupling dopant (TSL-8345:Toshiba Silicon co.) as a surface treatment dopant. The surface treatment films 11, 12 are, then, formed by means of heat treatment at 180° C. for 20 minutes in order to dry and bond at the surface. A controlling film will be formed after a surface treatment.

A PVA(poly-vinyl-alcohol) aqueous solution is applied on the surface treated alignment films 3, 4 to a thickness of 20~400 μm, and then the controlling films 5, 6 are formed on and adhere to the alignment films 3, 4 through the surface treatment films 11, 12 by means of drying the PVA aqueous solution at 70° C. for 2 hours. The controlling films 5, 6 are, then, peeled off of the substrates 1, 2 along the peeling direction 7, 8 at a constant speed of 2 cm/sec. As a result, the alignment film is obtained having an ability to orient and pretilt up liquid crystal molecules by means of polyimide organic polymer loop or organic polymer side chain around the surface.

The adhesion between the substrate and the alignment film, the adhesion between the alignment film and the controlling film, the yield stress of the alignment film, and the yield stress of the controlling film are according to the inequality (1).

After the alignment treatment, the pair of the substrates 1, 2 thus obtained are placed into a 90° TN by facing the surfaces 10, 11 thereof to each other, and then liquid crystal material(ZLI-3276-100:MERCK obtained 0.1 wt % chiral dopant) is filled into the space between the pair of the substrates 1, 2. A liquid crystal display device in accordance with the present invention thereby is obtained.

(EXAMPLE 7)

With reference to FIG. 4C, each transparent substrate is provided in advance with a transparent electrode(not shown). The polyimide alignment film 3 is formed to a thickness of 70~100 nm on the surface of the substrate 1 and is subjected to heat treatment at 180° C. for 1 hour.

Then, the following step is provided as a surface treatment.

The substrate 1 with the alignment film 3 thereon is dipped into an ethanol solution of silane coupling dopant (TSL-8345:Toshiba Silicon co.) as a surface treatment dopant. The surface treatment film 9 is, then, formed by means of heat treatment at 180° C. for 20 minutes in order to dry and bond at the surface.

Next, a roller 41 on which a sheetlike controlling film 42 made from PVA(poly-vinyl-alcohol) is wound up to 5 mm in thickness is readied, and the alignment film 3 which is provided as the surface treatment is rolled with the roller 42 in a constant direction at a constant speed. The controlling film 42 wound up on the roller 41 is adhered to the alignment film 3 and the controlling film 42 is immediately peeled off of the alignment film 3. As a result, organic polymer loop or organic polymer side chain of organic polymer molecule around the surface of the alignment film 3 are stretched out. The alignment treatment is, thereby, carried out completely. The roller is rolled on the substrate 3~5 times in this example.

After the alignment treatment, the pair of the substrates 1 thus obtained are placed into a 90° TN by facing the surface of the alignment film 3 to each other, and then liquid crystal material(ZLI-3276-100:MERCK obtained 0.1 wt % chiral dopant) is filled into the space between the pair of the substrate 1. A liquid crystal display device in accordance with the present invention thereby is obtained.

(EXAMPLE 8)

With reference to FIG. 9, each transparent substrate is provided in advance with a transparent electrode(not shown). The polyimide alignment film (not shown) is formed to a thickness of 30~70 nm on the surface of substrate 81 and is subjected to heat treatment at 180° C. for 1 hour. Then, a PVA(poly-vinyl-alcohol) aqueous solution is applied on the alignment film, and then the controlling film 82, 1~2 μm in thickness is formed thereon. Next, sheetlike film 86 larger than the substrate 81 is adhered to the alignment film 82 by means of drying treatment at 70° C. for 2 hours, the film 86 being made from PVA 30 μm in thickness.

The film 86 adhered to the controlling films 82 is peeled off of the substrates 1 along the peeling direction at a constant speed of 10 cm/sec. As a result, the alignment film is obtained having an ability to orient and pretilt up liquid crystal molecules by means of polyimide organic polymer loop or organic polymer side chain around the surface.

After the alignment treatment, the pair of the substrates thus obtained are placed into a 90° TN by facing the surface of the alignment film to each other, and then liquid crystal material(ZLI-3276-100:MERCK obtained 0.1 wt % chiral dopant) is filled into the space between the pair of the substrate. A liquid crystal display device in accordance with the present invention thereby is obtained.

(EXAMPLE 9)

A surface treatment is provided before applying the PVA aqueous solution of example 8 in this example.

With reference to FIG. 9, each transparent substrate is provided in advance with a transparent electrode (not shown). The polyimide alignment film (not shown) is formed to a thickness of 30~70 nm on the surface of substrate 81 and is subjected to heat treatment at 180° C. for 1 hour.

Then, the following step is provided as a surface treatment.

The substrate 81 with the alignment film thereon is dipped into an ethanol solution of silane coupling dopant(TSL-8345:Toshiba Silicon co.) as a surface treatment dopant. The surface treatment film is, then, formed by means of heat treatment at 180° C. for 20 minutes in order to dry and bond at the surface.

Next, a PVA(poly-vinyl-alcohol) aqueous solution is applied on the alignment film, and then the controlling film 82, with 1~2 μm in thickness is formed on. Then, sheetlike film 86 larger than the substrate 81 is adhered to the alignment film 82 by means of dry treatment at 70° C. for 2 hours, the film 86 being made from PVA 30 μm in thickness.

The film 86 adhered to the controlling film 82 is peeled off of the substrate 81 along the peeling direction at a constant speed of 10 cm/sec. As a result, the alignment film is obtained having an ability to orient and pretilt up liquid crystal molecules by means of polyimide organic polymer loop or organic polymer side chain around the surface.

After the alignment treatment, the pair of the substrate 81 thus obtained are placed into a 90° TN by facing the surface of the alignment film to each other, and then liquid crystal material(ZLI-3276-100:MERCK obtained 0.1 wt % chiral dopant) is filled into the space between the pair of the substrate 81. A liquid crystal display device in accordance with the present invention thereby is obtained.

The results of examples 1–9 are listed in Table 1. The liquid crystal display devices constructed in accordance with the present invention had excellent display ability. Liquid crystal display devices which were provided with rubbing treatment or film printed treatment(Japanese Patent Disclosure (KOKAI) No. 6-43458) are listed for comparison.

TABLE 1

| angel | alignment film | controlling film | state of alignment | pretilt |
| --- | --- | --- | --- | --- |
| EX1 | polyimide | PVA(POBARU235) | good | 2.5° |
| EX2 | polyimide | PVA(POBARU235) | good | 1.5° |
| EX3 | polyimide | PVA(POBARU205) | good | 3.5° |
| EX4 | nothing | PVA(POBARU235) | good | 0.5° |
| EX5 | polyimide | PVA(POBARU235) | good | 5.0° |
| EX6 | polyimide | PVA(POBARU235) | good | 3.5° |
| EX7 | polyimide | PVA(VINYLONFILM) | good | 3.5° |
| EX8 | polyimide | PVA(POBARU235) | good | 4.5° |
| EX9 | polyimide | PVA(POBARU235) | good | 3.5° |
| CM1 | polyimide | rubbing cloth | normal | 4.0° |
| CM2 | polyimide | film printed | good | 0° |

With respect to a state of alignment, disadvantageously, conventional rubbing treatment result in line faults on the alignment treatment surface. The examples of the present invention did not cause any dust in the process and there were never faults because of dust.

This invention provides a liquid crystal display device and a method of making the device having a novel uniform alignment film which has an ability to orient liquid crystal molecules without a step of rubbing treatment such as rubbing on the surface of the alignment film with a cotton or a cloth.

This invention can provide a liquid crystal display device and a method of making the device without a dust problem, which is suited to a manufacturing operation in a clean room.

This invention can provide a liquid crystal device and a method of making the device, which is able to induce to high pretilt angle of liquid crystal molecules suitable for make up a practical device.

Additional advantages and modifications will readily occur to those skilled in the art. The invention in its broader aspects is therefore not limited to the specific details, representative apparatus and method, and illustrative examples shown and described. Accordingly, departures may be made from such details without departing from the spirit or scope of the general inventive concept. Thus, it is intended that this invention cover the modifications and variations of the invention provided they are within the scope of the appended claims and their equivalents.

What is claimed is:

1. A method of making a liquid crystal display device, which includes a first substrate and a second substrate each having a first surface, and a liquid crystal material provided between said first surface of said first and second substrates, comprising the steps of:

aligning liquid crystal molecules at a pretilt angle greater than 0° by adhering a controlling film to said first surface of said first substrate and peeling said controlling film off of said first substrate;

positioning said first and said second substrates with their respective first surfaces confronting each other; and providing liquid crystal material between said first and second substrates.

2. A method of making a liquid crystal display device according to claim 1, further comprising a step of:

increasing said pretilt angle of said liquid crystal molecules by providing an alignment film on said first surface of said first substrate prior to adhering said controlling film.

3. A method of making a liquid crystal display device according to claim 1, further comprising a step of:

treating said first surface of said first substrate prior to adhering said controlling film to control adhesion between said first surface of said first substrate and said controlling film.

4. A method of making a liquid crystal display device according to claim 2 wherein the treating step includes exposing the surface to an organosilicon compound.

5. A method of making a liquid crystal display device according to claim 4, wherein said organosilicon compound is selected from the group consisting of N-(β-aminoethyl-γ-aminopropyltrimethoxysilane), γ-(glycidoxypropylmethyldimethoxysilane), and octadecylethoxysilane.

6. A method of making a liquid crystal display device according to claim 2, wherein the increasing step includes the substep of forming said alignment film to be composed of at least one material selected from the group consisting of polyimide, precursors of polyimide, polypyrrole, and polyaniline.

7. A method of making a liquid crystal display device according to claim 2, wherein the aligning step includes the substep of forming said controlling film to be composed of at least one material selected from the group consisting of poly-vinyl-alcohol and poly-vinyl-acetate; and the providing an alignment film step includes the substep of forming said alignment film to be composed of at least one material selected from the group consisting of polyimide and mixtures of polyimide and precursor of polyimide.

8. A method of making a liquid crystal display device according to claim 2, wherein the aligning step includes the substep of:

applying a controlling film material on said alignment film on said first substrate; and heating said controlling film material, whereby said material is hardened.

9. A method of making a liquid crystal display device according to claim 1, further comprising a step of:

treating said first surface of said first substrate prior to adhering said controlling film to control adhesion between said first surface of said first substrate and said controlling film.

10. A method of making a liquid crystal display device according to claim 9 wherein the treating step includes exposing the surface to an organosilicon compound.

11. A method of making a liquid crystal display device according to claim 10, wherein said organosilicon compound is selected from the group consisting of N-(β-aminoethyl-γ-aminopropyltrimethoxysilane), γ-(glycidoxypropylmethyldimethoxysilane), and octadecylethoxysilane.

12. A method of making a liquid crystal display device according to claim 1, wherein the aligning step includes the substep of forming said controlling film to be sheetlike.

13. A method of making a liquid crystal display device according to claim 1, wherein the aligning step includes the substep of forming said controlling film to be composed of at least one organic polymer.

14. A method of making a liquid crystal display device according to claim 1, wherein the aligning step includes the substep of forming said controlling film to be composed of at least one material selected from the group consisting of poly-vinyl-alcohol, poly-vinyl-acetate, derivatives of polystyrene, polyethylene, polycarbonate, and precursors of polyimide.

15. A method of making a liquid crystal display device according to claim 1, wherein the aligning step includes the substeps of:

applying a controlling film material on said first substrate; and heating said controlling film material, whereby said material is hardened.

16. A method of making a liquid crystal display device according to claim 1 wherein the peeling step includes the substep of peeling the controlling film in a constant direction.

* * * * *